US012248104B2

United States Patent
Lohmann et al.

(10) Patent No.: US 12,248,104 B2
(45) Date of Patent: Mar. 11, 2025

(54) OPTICAL SENSOR ACCORDING TO THE TIME-OF-FLIGHT PRINCIPLE FOR DETECTING OBJECTS IN A MONITORED REGION

(71) Applicant: Pepperl+Fuchs SE, Mannheim (DE)

(72) Inventors: Lutz Lohmann, Berlin (DE); Hinrik Weber, Berlin (DE)

(73) Assignee: Pepperl+Fuchs SE, Mannheim (DE)

( * ) Notice: Subject to any disclaimer, the term of this patent is extended or adjusted under 35 U.S.C. 154(b) by 1007 days.

(21) Appl. No.: 17/283,991

(22) PCT Filed: Oct. 11, 2019

(86) PCT No.: PCT/EP2019/077665
§ 371 (c)(1),
(2) Date: Apr. 9, 2021

(87) PCT Pub. No.: WO2020/074735
PCT Pub. Date: Apr. 16, 2020

(65) Prior Publication Data
US 2021/0349194 A1    Nov. 11, 2021

(30) Foreign Application Priority Data

Oct. 12, 2018   (DE) .......................... 102018125253.6

(51) Int. Cl.
*G01S 7/497*   (2006.01)
*G01S 7/4865*   (2020.01)

(52) U.S. Cl.
CPC ............ *G01S 7/497* (2013.01); *G01S 7/4865* (2013.01)

(58) Field of Classification Search
None
See application file for complete search history.

(56) References Cited

U.S. PATENT DOCUMENTS 4,699,508 A   10/1987   Bolkow et al.
5,793,491 A   8/1998   Wangler et al.
(Continued)

FOREIGN PATENT DOCUMENTS

CN   101034155 A   9/2007
CN   102265178 A   11/2011
(Continued)

OTHER PUBLICATIONS

International Application No. PCT/EP2019/077665, International Search Report and Written Opinion with English Translation, Dec. 9, 2019, 19 pages.
(Continued)

*Primary Examiner* — Luke D Ratcliffe
(74) *Attorney, Agent, or Firm* — LaBatt, LLC

(57) ABSTRACT

The invention relates to an optical sensor according to the time-of-flight principle for detecting objects in a monitored region, having a first transmitter for transmitting first light pulses into the monitored region, a first receiver for detecting first light pulses radiated back by a first object to be detected in the monitored region, a second transmitter for transmitting second light pulses into the monitored region, a second receiver for detecting second light pulses radiated back by the first object or by a further object in the monitored region, a control and evaluation unit which is designed to control the first transmitter and to evaluate the first light pulses detected by the first receiver and to control the second transmitter and to evaluate the second light pulses detected by the second receiver, characterised in that between the first transmitter and the second receiver a first optical reference path is formed, between the second transmitter and the first receiver a second optical reference path is formed, the control and evaluation unit is designed to trigger the first transmitter to transmit first test light pulses (Continued)

which reach the second receiver on the first optical reference path and to activate the second receiver after a first time offset, the first time offset corresponding to a time of flight of the first test light pulses over the first optical reference path, and/or to trigger the second transmitter to transmit second test light pulses which reach the first receiver on the second optical reference path and to activate the first receiver after a second time offset, the second time offset corresponding to a time of flight of the second test light pulses over the second optical reference path, and to evaluate the first test light pulses detected by the second receiver and/or the second test light pulses detected by the first receiver.

20 Claims, 5 Drawing Sheets

(56) References Cited

U.S. PATENT DOCUMENTS

| | | | |
|---|---|---|---|
| 9,041,918 | B2 | 5/2015 | Eisele et al. |
| 9,423,499 | B2 | 8/2016 | Hammes |
| 2004/0233414 | A1 | 11/2004 | Jamieson et al. |
| 2007/0076189 | A1* | 4/2007 | Kumagai ............... G01S 7/4868 356/5.01 |
| 2009/0091739 | A1 | 4/2009 | Kim et al. |
| 2009/0122295 | A1 | 5/2009 | Eaton |
| 2010/0245849 | A1 | 9/2010 | Satzky et al. |
| 2011/0310377 | A1 | 12/2011 | Ohishi et al. |
| 2012/0013888 | A1* | 1/2012 | Aoki ....................... G01S 17/36 356/5.09 |
| 2014/0168632 | A1 | 6/2014 | Eisele et al. |
| 2015/0285912 | A1 | 10/2015 | Hammes |
| 2016/0109616 | A1 | 4/2016 | Hammes |
| 2016/0327649 | A1 | 11/2016 | Albert et al. |

FOREIGN PATENT DOCUMENTS

| | | |
|---|---|---|
| DE | 10318764 A1 | 11/2003 |
| DE | 202012101007 U1 | 6/2013 |
| DE | 202012103344 U1 | 12/2013 |
| DE | 102012223689 B3 | 1/2014 |
| DE | 202012010014 U1 | 1/2014 |
| DE | 102014115260 B3 | 11/2015 |
| EP | 0066888 A2 | 12/1982 |
| EP | 0623829 A1 | 11/1994 |
| EP | 2796891 A1 | 11/1994 |
| EP | 1430459 A1 | 6/2004 |
| EP | 2431766 A1 | 3/2012 |
| EP | 2530485 A1 | 12/2012 |
| EP | 2927711 A1 | 10/2015 |
| EP | 3091271 A1 | 11/2016 |
| JP | 2007093514 A | 4/2007 |
| JP | 2010190759 A | 9/2010 |
| WO | 2011014712 A2 | 2/2011 |

OTHER PUBLICATIONS

DE Application No. 102018125253.6, Office Action, Aug. 26, 2019, 3 pages (no english translation).

Office Action for Chinese Application No. 20198006639.X with English translation, mailed Apr. 15, 2023, 17 pages.

* cited by examiner

OPTICAL SENSOR ACCORDING TO THE TIME-OF-FLIGHT PRINCIPLE FOR DETECTING OBJECTS IN A MONITORED REGION

The present invention relates to an optical sensor according to the time-of-flight principle for detecting objects in a monitored region according to the preamble of claim 1.

A generic optical sensor is known for example from DE 10 2014 115 260 B3 and has the following components: a first transmitter for transmitting first light pulses into the monitored region, a first receiver for detecting first light pulses radiated back by a first object to be detected in the monitored region, a second transmitter for transmitting second light pulses into the monitored region, a second receiver for detecting second light pulses radiated back by the first object or by a further object in the monitored region, at least one control and evaluation unit which is designed to control the first transmitter and to evaluate the first light pulses detected by the first receiver and to control the second transmitter and to evaluate the second light pulses detected by the second receiver.

Also known in principle are security scanners with which the PL-d (performance level D) is realised. The security concept is based in this case essentially upon a single-channel measuring system which is tested using internal reference paths. Due to the internal reference element the protective field angles are often smaller than 360 degrees and frequently even smaller than 270 degrees. Such single-channel security scanners are not suitable for applications in which the PL-e (performance level E) is required. On account of the limited protective field angle these security scanners are likewise not suited for navigation simultaneously.

Further optical sensors in which steps have been taken to increase security are known from DE 20 2012 103 344 U1 and DE 20 2012 010 014 U1.

In EP 2 927 711 B1, for example, a laser scanner having a rotating test light transmitter and an internal reference system is described. With the test light transmitter a receiver can be tested, wherein a light path from the test light transmitter to the receiver runs completely within the interior of the laser scanner.

A generic sensor for applications in the field of traffic monitoring is further described in U.S. Pat. No. 5,793,491.

It can be regarded as an object of the present invention to provide an optical sensor of the type indicated above, wherein the measuring and testing operations can be carried out particularly effectively.

This object is achieved by means of the optical sensor having the features of claim 1.

Advantageous embodiments of the optical sensor according to the invention will be explained below, in particular by reference to the dependent claims and the drawings.

The optical sensor of the type indicated above has been refined according to the invention in that between the first transmitter and the second receiver, in particular internally, a first optical reference path is formed, between the second transmitter and the first receiver, in particular internally, a second optical reference path is formed, the at least one control and evaluation unit is designed to trigger the first transmitter to transmit first test light pulses, which reach the second receiver on the first optical reference path, and to activate the second receiver, in particular at the latest, after a first time offset, the first time offset corresponding to a time of flight of the first test light pulses over the first optical reference path, and/or to trigger the second transmitter to transmit second test light pulses, which reach the first receiver on the second optical reference path, and to activate the first receiver, in particular at the latest, after a second time offset, the second time offset corresponding to a time of flight of the second test light pulses over the second optical reference path, and to evaluate the first test light pulses detected by the second receiver and/or the second test light pulses detected by the first receiver.

In principle the second receiver can already be activated at the time of emission of the first test light pulses (or already prior thereto) and the first receiver can already be activated at the times of emission of the second test light pulses (or already prior thereto). It is essential for the second receiver to be active when the first test light pulses hit it and for the first receiver to be active when the second test light pulses hit it.

It can be regarded as a core idea of the present invention that in a laser scanner with a two-channel structure the transmitter of the first channel is connected to the receiver of the second channel and the transmitter of the second channel is connected to the receiver of the first channel through a reference path in each case.

A first substantial advantage of the present invention can be seen in that the transmitters and receivers provided each carry out a dual function, namely measuring and also testing. This means that it is not necessary to additionally have components available that are used exclusively for testing. The components present are therefore used particularly effectively in the present invention.

In optical sensors according to the time-of-flight principle light pulses are transmitted into the monitored region and radiated back by objects located there in the direction of the optical sensor to a receiver. From a measured time difference between a time of emission of a light pulse and the time of receipt of the light pulse radiated back by an object in the monitored region, the distance of the object in question from the sensor is then calculated using the speed of light in the known manner.

Transmitters used are mostly semiconductor components such as light-emitting diodes and/or laser diodes, which emit in the visible range or in the infrared range. Receivers used are generally photodiodes or APDs. These components and their use are known in themselves.

The control and evaluation unit or control and evaluation units used are mostly microcontrollers, FPGA or comparable components. In principle a control and evaluation unit that controls both transmitters and both receivers and reads both receivers will suffice. It is also possible, however, for a first and a second control and evaluation unit to be present, wherein the first control and evaluation unit controls the first transmitter and the first receiver and reads the first receiver, and the second control and evaluation unit controls the second transmitter and the second receiver and reads the second receiver.

The role of the first reference path and the second reference path is that through them a defined optical path and a defined optical transmission are provided between the first transmitter and the second receiver and between the second transmitter and the first receiver. The first reference path and/or the second reference path can extend in principle through the air. In a particularly preferred variant of the optical sensor according to the invention the first reference path and/or the second reference path is/are formed by a light conductor, in particular by an optical fibre, in particular arranged in a housing. The optical properties of the reference paths can be kept so very constant that they are known at the time of the test measurements, that is to say they are referenceable and cannot represent error sources.

The first test light pulses measured by the second receiver and/or the second test light pulses measured by the first receiver are evaluated by the control and evaluation unit or by the respective control and evaluation units. In dependence upon these evaluations certain signals can be output, for example via error functions or degradations of transmitters and/or receivers.

In principle individual measurements of test light pulses can already provide valuable information on the status of the optical sensor, in particular the status of the transmitters and receivers. However, it is particularly advantageous furthermore for the control and evaluation unit or the control and evaluation units to be designed to determine the test light pulses over a plurality of scan periods. Particularly preferably the determined or measured test light pulses are averaged over a plurality of scan periods. This allows more precise information to be obtained on the status of the transmitters and receivers, in particular concerning gradual changes and changes taking place over longer time periods.

In principle the first and the second time offset can be greater than a time of flight of light pulses from the first or second transmitter to an object in the monitored region and back to the first or second receiver. This would be the case with a reference path that is comparably long in optical terms and which can be realised for example by means of a correspondingly long glass fibre. Particularly preferably, however, the first time offset is smaller than a time of flight of light pulses from the second transmitter to an object in the monitored region and back to the second receiver, and/or the second time offset is smaller than a time of flight of light pulses from the first transmitter to an object in the monitored region and back to the first receiver. This can be realised through a correspondingly short reference path, for example with a comparably short glass fibre.

The optical sensor according to the invention facilitates a plurality of operating modes. For example, if a test operation is clearly to be separated from the measuring operation, it can be preferable for the control and evaluation unit to be designed to deactivate the first receiver, in particular for a certain time duration, if the first transmitter transmits test light pulses, and/or to deactivate the second receiver, in particular for a certain time duration, if the second transmitter transmits test light pulses. If it is ensured that light pulses from the first transmitter cannot reach the second receiver via the monitored region and objects present there, and also that light pulses from the second transmitter cannot reach the first receiver via the monitored region and objects present there, it is possible in this operating mode to practically exclude any influencing of the real measurements on an object in the monitored region by test measurements. The time duration for which the first receiver and/or the second receiver is/are to be deactivated in each case must be greater than typical times of flight of light pulses from the transmitters to an object in the monitored region and back to the receivers.

The transmitters and receivers provided can be used particularly effectively in a further operating mode, which is characterised in that the control and evaluation unit is designed to activate the first receiver, in particular after a time offset and in particular for a certain time duration, if the first transmitter transmits light pulses or test light pulses, and/or to activate the second receiver, in particular after a time offset and in particular for a certain time duration, if the second transmitter transmits light pulses or test light pulses.

In this operating mode use is made of the fact that the test light pulses of the first transmitter and of the second transmitter are qualitatively the same light pulses as the transmitted light pulses and can therefore also be used as transmitted light pulses for the actual measurements.

The time duration for which the second receiver is activated if the first transmitter transmits test light pulses may not be so great that light pulses of the first transmitter that reach the second receiver via an object in the monitored region are detected by said second receiver. Correspondingly the time duration for which the first receiver is activated if the second transmitter transmits test light pulses may not be so great that light pulses of the second transmitter that reach the first receiver via a typical object in the monitored region are detected by said first receiver.

It is generally understood that where reference is made here to activating or deactivating the receivers this can indeed be realised through a full connection or disconnection of the respective receivers. In principle, however, the receiver does not have to be disconnected, but instead, also in the respective time intervals where the receiver is to be deactivated, the measurement results can be ignored by the control and evaluation unit. Intermediate variants are possible here.

It is particularly useful for the control and evaluation unit to be designed to control the first transmitter and the second transmitter with the same frequency for transmitting test light pulses, and to control the first transmitter and the second transmitter with a time offset, in particular in respectively equal time intervals, for transmitting test light pulses. The test information is therefore obtained for the tested components with the same frequency and the quality of the testing is the same for all tested components.

The optical sensor according to the invention can in principle be a static optical sensor. The advantages of the optical sensor according to the invention are particularly significant, however, if the optical sensor according to the invention is formed as a 2D scanner.

In preferred embodiments of the optical sensor according to the invention as a 2D scanner the first transmitter, the first receiver, the second transmitter and the second receiver are arranged on a rotor of the 2D scanner and the optical axes of the first transmitter, the first receiver, the second transmitter and the second receiver are orientated transversely, in particular perpendicularly, relative to an axis of rotation of the rotor.

The optical axes of the first transmitter and the first receiver are usefully orientated in a first azimuthal direction relative to the axis of rotation of the rotor and the optical axes of the second transmitter and the second receiver are usefully orientated in a second azimuthal direction relative to the axis of rotation of the rotor.

In principle the optical axes of the first transmitter and the first receiver and the optical axes of the second transmitter and the second receiver can be positioned as desired relative to each other.

In a particularly preferred variant, the first azimuthal direction is counter to the second azimuthal direction. This generally precludes transmitted light pulses of the first transmitter being able to reach the second receiver via the monitored region and transmitted light pulses of the second transmitter being able to reach the first receiver via the monitored region.

It can also be preferred that the first azimuthal direction is the same as the second azimuthal direction and that the first transmitter, the first receiver, the second transmitter and the second receiver are arranged on the rotor spaced apart from each other in a direction of the axis of rotation of the rotor.

If the first transmitter is positioned relative to the second receiver so that transmitted light pulses of the first transmitter can reach the second receiver via the monitored region and objects located there, it must be ensured that in the time intervals in question the second receiver is deactivated by the control and evaluation unit. In the same way, if the second transmitter is positioned relative to the first receiver so that transmitted light pulses of the second transmitter can reach the first receiver via objects in the monitored region, the first receiver must be deactivated by the control and evaluation unit in the time intervals where light pulses of the second transmitter can hit said first receiver via objects in the monitored region.

In order to achieve in such an arrangement an, as far as possible, identical hit point of the transmitted light pulses of the first transmitter and of the second transmitter on an object in the monitored region, in particular at a standard distance, the optical axis of the first transmitter can be tilted relative to an optical axis of the second transmitter.

In principle it is also possible for two or also four further pairs of transmitters and receivers to be provided, which are likewise arranged on the rotor of the 2D scanner. The pairs of transmitters and receivers can be arranged on the rotor at equidistant angles relative to each other. It can be useful for example to provide four transmitters and four receivers, wherein in each case one transmitter and one receiver form a pair and have in each case optical axes parallel to each other. These four pairs can advantageously be mounted on a rotor so that the optical axes are each offset by 90 degrees relative to each other Further advantages and features of the present invention will be described below by reference to the attached drawings, in which:

Identical or similar components are generally identified in the figures by the same reference numerals.

Figure 1:
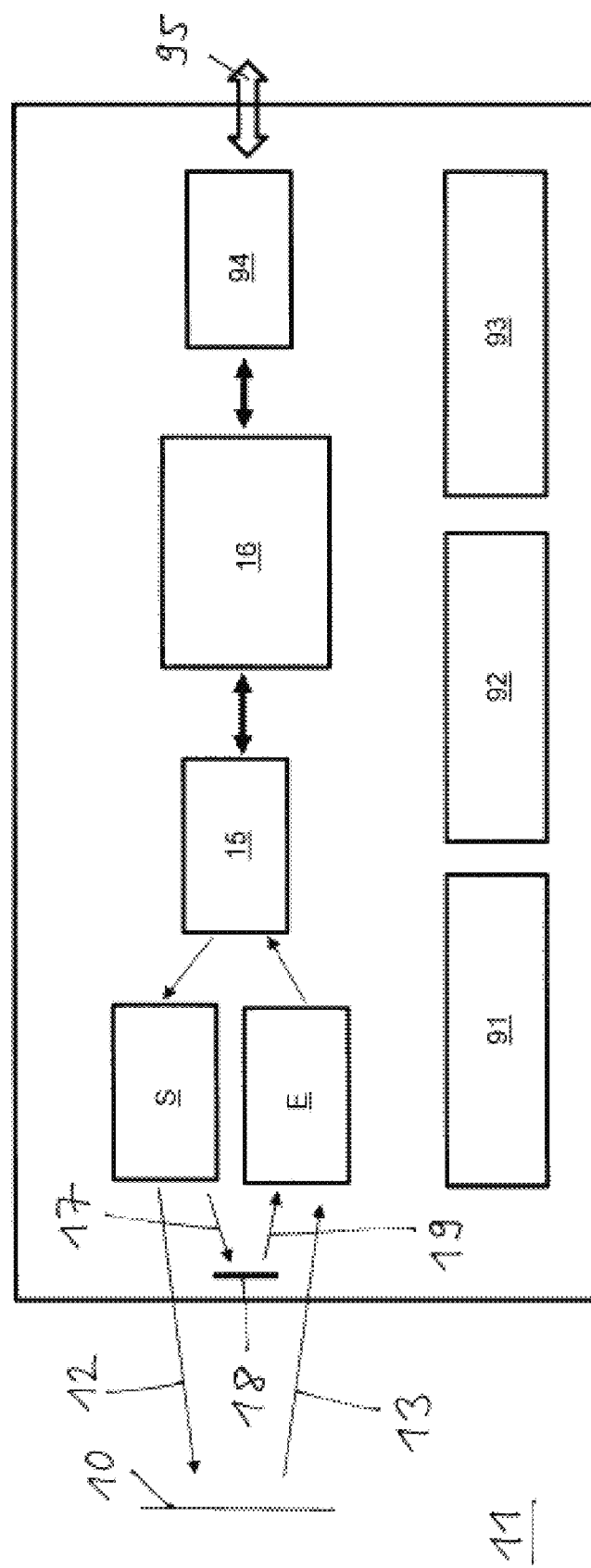
FIG. 1 shows an optical sensor of the prior art.

An optical sensor 200 according to the prior art will be explained by reference to FIG. 1. The optical sensor 200 has, as basic components, a transmitter S, a receiver E, a measuring core 15, a control and evaluation unit formed by a measurement controller 16, and an interface 94, 95.

Via the interface 94, 95 the sensor 200 can send or communicate data, for example via a bus system.

The sensor 200 is a sensor according to the time-of-flight principle and works essentially as follows: the transmitter S transmits light pulses 12 into the monitored region 11 and these light pulses are radiated back by an object 10 located in the monitored region 11. These radiated-back light pulses 13 are detected by the receiver E. The time difference between a time of emission of a light pulse 12 and the timepoint at which the radiated-back light pulse 13 is detected by the receiver E is measured. The relationship:

$$d = \text{time difference} \cdot \text{speed of light}/2$$

provides the distance d of the object 10 from the optical sensor 200.

In order to obtain information on the components used for the measurement, transmitter S and receiver E, the optical sensor 200 in FIG. 1 has an internal test path with a test object. For testing, the transmitter S transmits test light pulses 17 in a test operation. These are radiated back by the test object 18. The radiated-back test light pulses 19 are then detected by the receiver E and subsequently evaluated via the measuring core 15 by the measurement controller 16. If the detected test light pulses 19 do not have the expected properties, certain signals, for example error signals, can be output, or certain actions, for example disconnection of the sensor, can be triggered.

Further components of the optical sensor 200 provided are: a module 91 for monitoring a front screen, an angle sensor 92 for a rotor (if the sensor 200 is a 2D scanner) and a power supply 93.

Exemplary embodiments of optical sensors 100 and 300 according to the invention, wherein these can be in particular 2D scanners, will be described in association with FIGS. 2 to 5. The optical sensors 100 and 300 are sensors according to the time-of-flight principle for detecting objects in a monitored region 11. The optical sensor 100 has, as essential components, firstly a first transmitter S1, a first receiver E1, a second transmitter S2 and a second receiver E2. The first transmitter S1 is used initially to transmit first light pulses 22 into the monitored region 11. The first receiver E1 is used initially to detect light pulses 23 which are radiated back by an object to be detected 10 in the monitored region 11. The second transmitter S2 is used initially to transmit second light pulses 32 into the monitored region 11. The second receiver E2 is used initially to detect light pulses 33 which are radiated back by the object 10.

To control the first transmitter S1 and read the first receiver E1 a first measuring core 25 and a first measurement controller 26 are provided. Through the first transmitter S1, the first receiver E1, the first measuring core 25 and the first measurement controller 26, a first channel 20 is formed.

To control the second transmitter S2 and read the second receiver E2, a second measuring core 35 and a second measurement controller 36 are provided. Through the second transmitter S2, the second receiver E2, the second measuring core 35 and the second measurement controller 36, a second channel 30 is formed.

The first measurement controller 26 and the second measurement controller 36 can be formed in principle by one and the same microcontroller. The first measurement controller 26 and the second measurement controller 36 together form a control and evaluation unit 26, 36 provided according to the invention, which is designed to control the first transmitter S1 and to evaluate the first light pulses 23 detected by the first receiver E1, and to control the second transmitter S2 and to evaluate the second light pulses 33 detected by the second receiver E2.

The control and evaluation unit 26, 36 can receive and send data over an interface 94, 95 in a manner known in itself, for example via a bus system.

Figure 2:
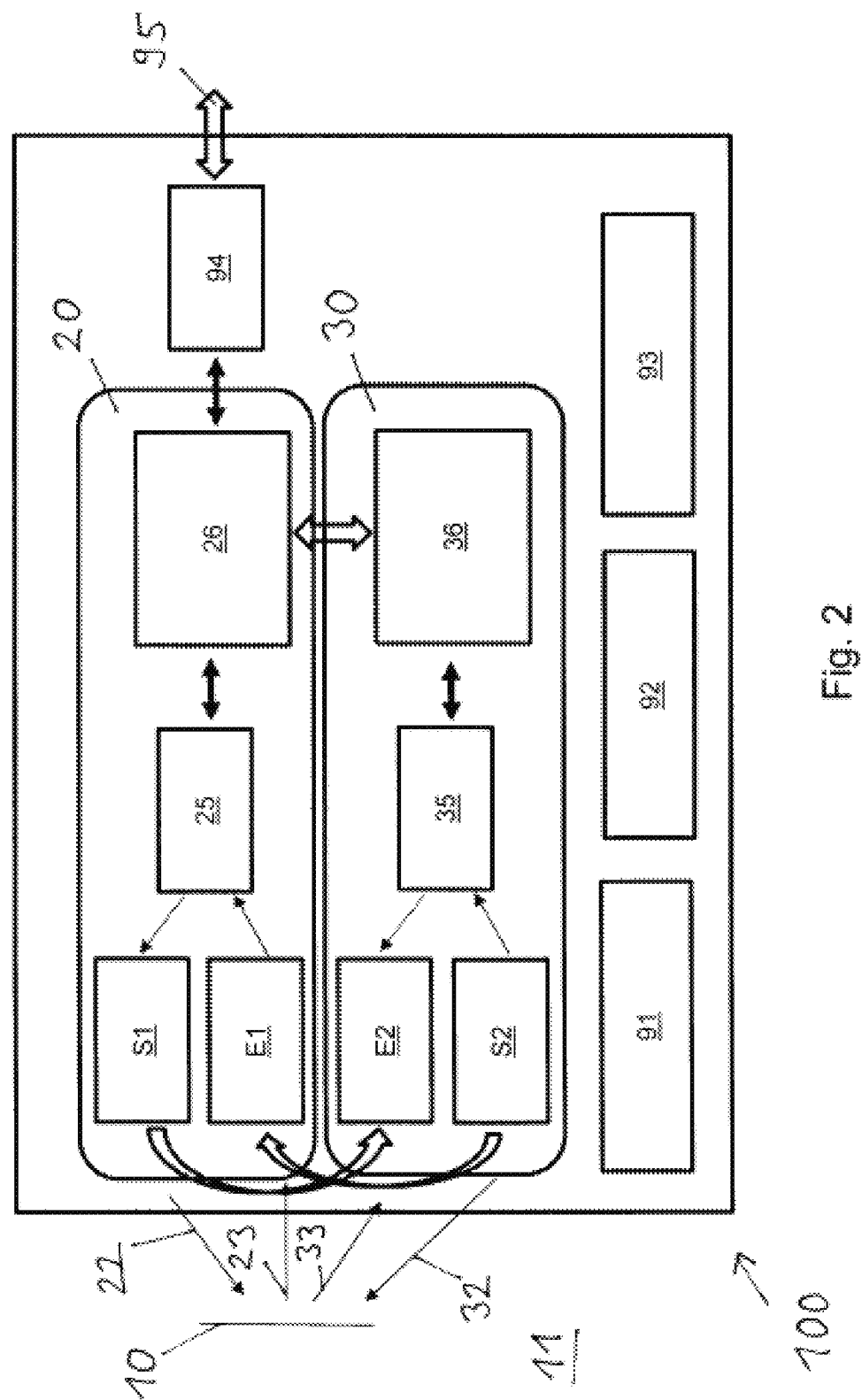
FIG. 2 shows an exemplary embodiment of an optical sensor according to the invention.

In the exemplary embodiment shown in FIG. 2 the optical axes of the first transmitter S1, the first receiver E1, the second transmitter S2 and the second receiver E2 point in the same direction.

Also formed in the optical sensor 100, but not shown in FIG. 2, according to the invention between the first transmitter S1 and the second receiver E2, for example and preferably internally, is a first optical reference path, and formed between the second transmitter S2 and the first receiver E1, for example and preferably internally, is a second optical reference path.

Figure 3:
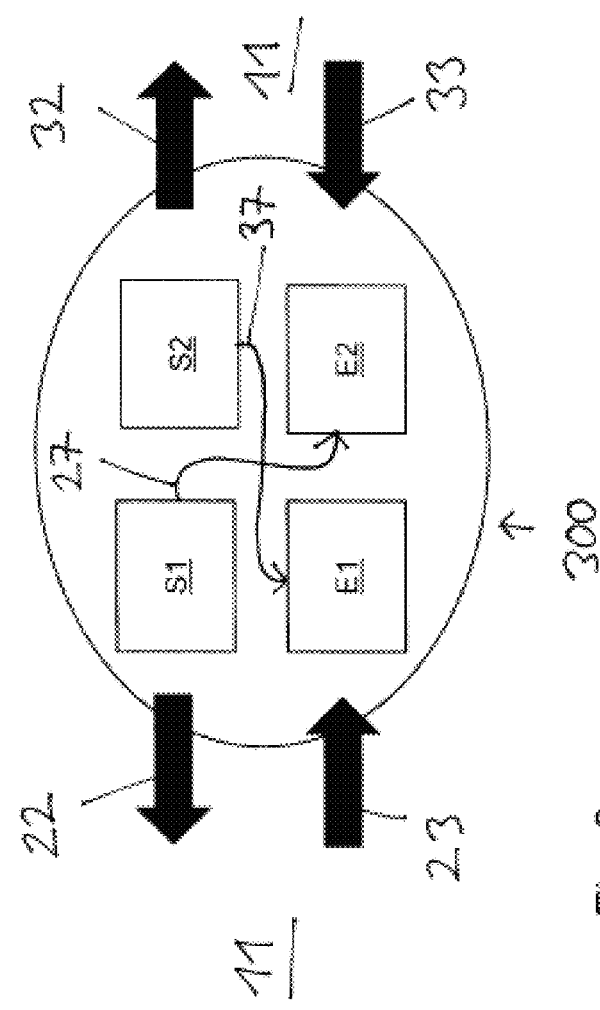
FIG. 3 shows a schematic view to explain the reference path in an optical sensor according to the invention.

These reference paths can be realised in the exemplary embodiment of FIG. 2 for example through optical fibres between the first transmitter S1 and the second receiver E2 and between the second transmitter S2 and the first receiver E1, as shown in FIG. 3 for a variant of an optical sensor 300 according to the invention. In the case of the optical sensor 300 shown schematically in FIG. 3, it can also be a 2D scanner, but wherein, by way of departure from the exemplary embodiment shown in FIG. 2, the optical axis of the first transmitter S1 and the first receiver E1 is orientated counter to that of the second transmitter S2 and the second receiver E2. It is also schematically shown in FIG. 3 that between the first transmitter S1 and the second receiver E2 a reference path 27 is formed by an optical fibre and, furthermore, between the second transmitter S2 and the first receiver E1 a reference path 37 is also formed by an optical fibre.

The control and evaluation unit 26, 36 is designed according to the invention to trigger the first transmitter S1 to transmit first test light pulses 42, 46, which reach the second receiver E2 on the first optical reference path 27, and to activate the second receiver E2, in particular at the latest, after a first time offset, the first time offset corresponding to a time of flight of the first test light pulses 42, 46 over the first optical reference path 27, and/or to trigger the second transmitter S2 to transmit second test light pulses 63, 67, which reach the first receiver E1 on the second optical reference path 37, and to activate the first receiver E1, in particular at the latest, after a second time offset, the second time offset corresponding to a time of flight of the second test light pulses 63, 67 over the second optical reference path 37.

In principle the second receiver E2 can already be activated at the times of emission of the first test light pulses 42, 46 and the first receiver E1 can already be activated at the times of emission of the second test light pulses 63, 67. It is essential that the second receiver E2 is activated at the timepoints at which the first test light pulses 42, 46 hit said second receiver E2, and that the first receiver E1 is activated at the timepoints at which the second test light pulses 63, 67 hit said first receiver E1.

The first test light pulses 42 detected by the second receiver E2 and/or the second test light pulses 63 detected by the first receiver E1 are evaluated by the control and evaluation unit 26, 36. In dependence upon this evaluation, certain signals, for example error signals, can be output via error functions or degradations of the transmitters or receivers, or certain actions, for example a disconnection of the sensor, can be initiated.

Operating modes for the optical sensors 100 and 300 according to the invention will be explained by reference to FIGS. 4 and 5. These show in each case flowcharts, wherein, with respect to a time axis 82, the respective intensity progressions of the transmission powers of the first transmitter S1 and the second transmitter S2 and also the intensities received by the first receiver E1 and the second receiver E2 are shown on the vertical axis 84.

Corresponding to the temporal course is one respective rotation of the 2D scanner. FIGS. 4 and 5 show the progression over a full rotation from 0 to 360 degrees of a rotor of the 2D scanner.

Figure 4:
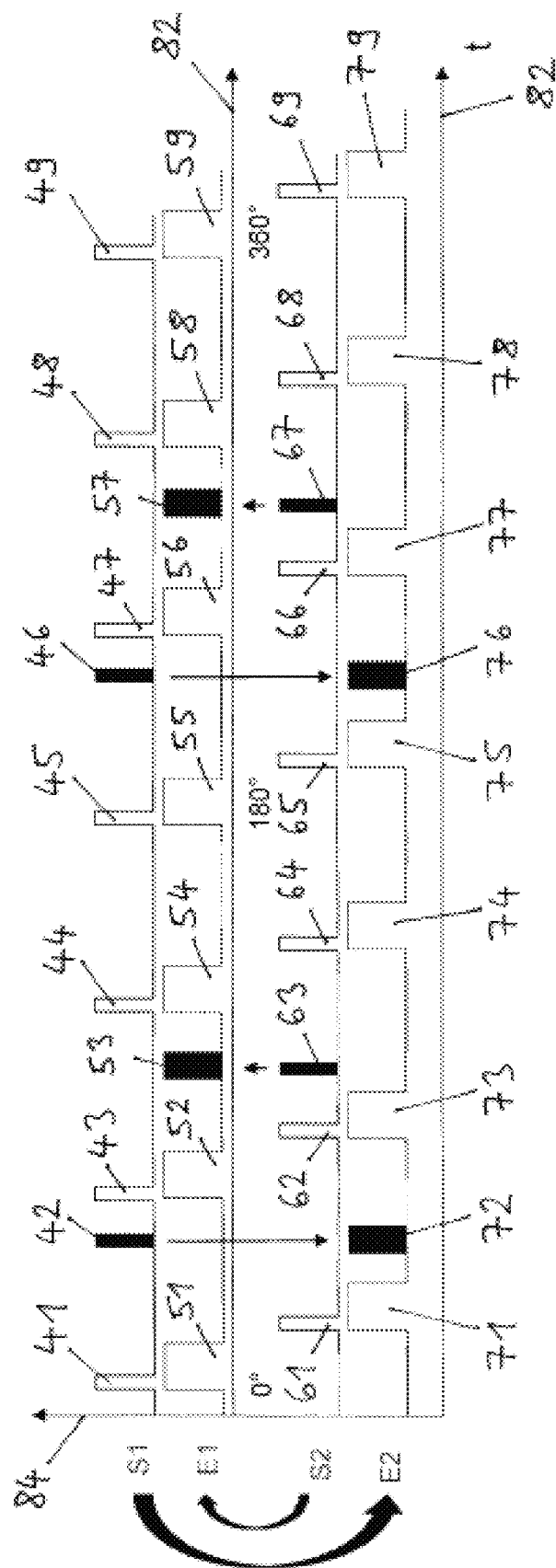
FIG. 4 shows a diagram to explain a first operating mode of an optical sensor according to the invention.

It is essential for the operating mode shown in FIG. 4 that the test phases are separated from the measuring phases. For example, the first transmitter S1 transmits first transmission pulses 41, 44, 45, 48 and 49, which cause in each case, after being radiated back by an object to be detected 10 in the monitored region 11, receiving pulses 51, 52, 54, 55, 56, 58 and respectively 59 in the first receiver E1. The schematically shown broadening of the received pulses in comparison with the transmitted pulses is caused substantially by the properties of the object radiating back said received pulses.

Correspondingly the second transmitter S1 transmits second transmission pulses 61, 62, 64, 65, 66, 68 and 69, which, after being radiated back by an object to be detected in the monitored region 11, trigger receiving pulses 71, 73, 74, 75, 77, 78, 79 in the second receiver E2. The object which radiates back the second transmission pulses can be either the same object to be detected 10 that has already radiated back the first transmission pulses. This would be the case with a geometry as in FIG. 2. It can, however, also be another object to be detected, namely when the optical axis of the first transmitter S1 and the first receiver E1 is different from the optical axis of the second transmitter S2 and the second receiver E2. This is the situation in the exemplary embodiment shown in FIG. 3, where the viewing direction of the first transmitter S1 and the first receiver E1 is counter to the viewing direction of the second transmitter S2 and the second receiver E2.

Taking place separately from these measuring operations in the process, or course, shown in FIG. 4 are the test measurements. For example, the first transmitter S1 transmits first test light pulses 42, 46, which reach the second receiver E2 via the first reference path 27 and cause receiving pulses 72 and respectively 76 there. Correspondingly the second transmitter S2 transmits second test light pulses 63, 67, which reach the first receiver E1 via the second reference path 37 and cause receiving pulses 53 and respectively 57 there. In the time phases after the times of emission of the first test light pulses 42, 46, in which test light pulses 42, 46 radiated back from the monitored region 11 by an object would hit the first receiver E1, the first receiver E1 is deactivated by the control and evaluation unit 26, 36.

Correspondingly the second receiver E2 is deactivated by the control and evaluation unit 26, 36 in the time phases after the times of emission of the second test light pulses 63, 67, in which test light pulses 63, 67 radiated back from the monitored region 11 hit said second receiver E2.

Since, in the process shown in FIG. 4, the measuring and the testing take place completely separately from each other in time, the measurements and the test measurements cannot influence or distort each other.

Figure 5:
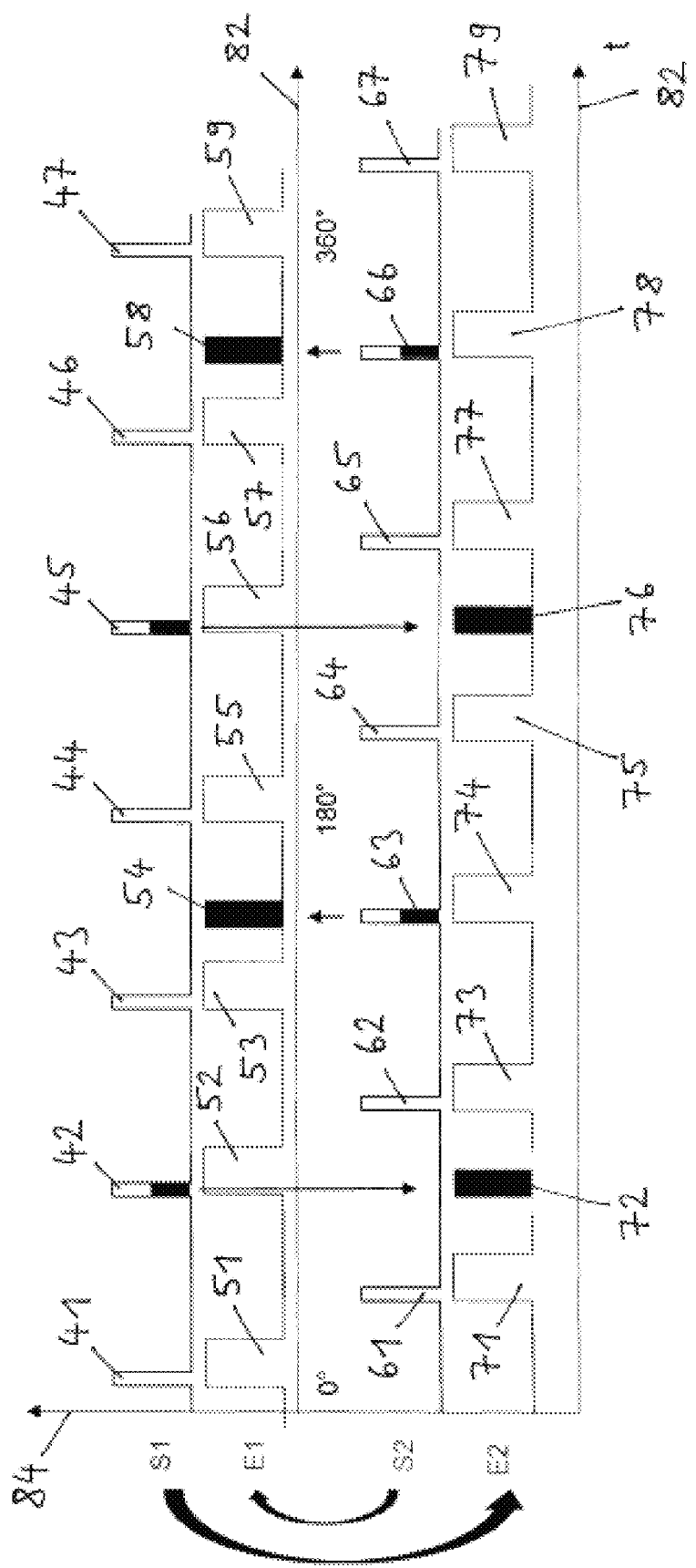
FIG. 5 shows a diagram to explain a second operating mode of an optical sensor according to the invention.

The important difference of the process shown in FIG. 5 in comparison with that of FIG. 4 is that some of the light pulses transmitted by the first transmitter S1, namely the light pulses 42 and 45, and some of the light pulses transmitted by the second transmitter S2, namely the light pulses 63 and 66, respectively serve both for test measurements and also for the actual distance measurements. For example, a portion of the light pulses 42, 45 reaches the second receiver E2 via the first reference path 27 and causes a receiving pulse 72 or 76 there. A further portion of the light pulses 42 and 45 is radiated into the monitored region 11, radiated back by an object there and then reaches the first receiver E1, causing a receiving pulse 52 or respectively 56 there.

Correspondingly a portion of the light pulses 63 and 66 reaches the first receiver E1 via the second reference path 37 and causes a receiving pulse 54 or respectively 58 there. A further portion of the light pulses 63 and 66 is radiated into the monitored region 11, radiated back by an object there and then reaches the second receiver E2, causing a receiving pulse 74 or respectively 78 there.

The advantage of the process shown in FIG. 5 is that fewer light pulses are required overall, because at least some of the light pulses are used both for measuring and also for testing. The useful life of the light transmitters used and hence the service life of each of the sensors can therefore be increased.

Figure 6:
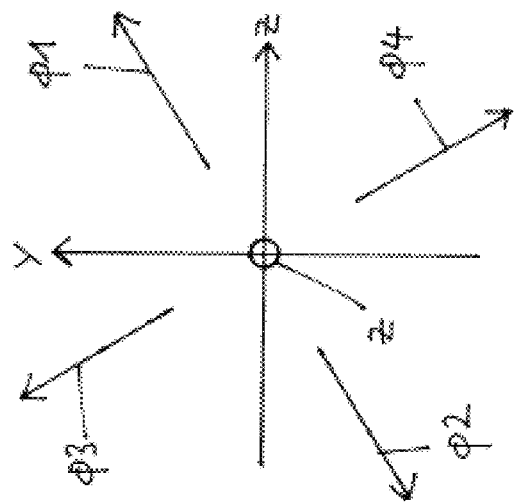
FIG. 6 shows a schematic view to explain the concepts of the axis of rotation of a rotor and the azimuthal direction.

FIG. 6 illustrates the concepts of the axis of rotation of a rotor in a 2D scanner and the azimuthal direction. Shown schematically is a coordinate system x, y, z, wherein the axis of rotation of the rotor is orientated collinearly relative to the z axis. For example, in one exemplary embodiment of an optical sensor according to the invention having two transmitters S1, S2 and two receivers E1, E2, the optical axes of the first transmitter S1 and the first receiver E1 can be orientated in the first azimuthal direction $\varphi 1$, and the optical axes of the second transmitter S2 and the second receiver can be orientated in the second azimuthal direction $\varphi 2$. This would be the case for example in the variant shown in FIG. 3. In an embodiment having a total of four transmitters and four receivers, the two further pairs of transmitter and receiver could be orientated in the direction of the azimuthal direction $\varphi 3$ and $\varphi 4$. The pairs of transmitter and receiver are then positioned in each case at an angle of 90 degrees relative to each other.

With the present invention a novel optical sensor for detecting objects in a monitored region is provided, wherein the testing and measuring are realised particularly effectively. The optical sensor can be formed as a 2D scanner with an angle detection range of 360 degrees. The optical sensor according to the invention can be used in particular as a security scanner for the PL-d (performance level d). Particularly advantageous applications are possible for navigation, for example in floor conveyors.

LIST OF REFERENCE NUMERALS

10 Object to be detected
11 Monitored region
12 Transmitted light
13 Light radiated back by the object 10
15 Measuring core
16 Measurement controller
17 Test light of a test light path
18 Test object
19 Test light radiated back by the test object 19
20 First channel
22 Transmitted light of the transmitter S1
23 Light radiated back by the object 10 and detected by the receiver E1
25 Measuring core of the first channel
26 Measurement controller of the first channel
27 Light conductor
30 Second channel
32 Transmitted light of the transmitter S2
33 Light radiated back by the object 10 and detected by the receiver E2
35 Measuring core of the second channel
36 Measurement controller of the second channel
37 Light conductor
41-49 Transmitted pulses of the transmitter S1
51-59 Received pulses of the receiver E1
61-69 Transmitted pulses of the transmitter S2
71-79 Received pulses of the receiver E2
82 Time axis
84 Intensity axis
91 Window monitoring
92 Angle sensor
93 Power supply
94 Interface
95 Bi-directional arrow
100 Optical sensor according to the invention
200 Optical sensor according to the prior art
S Transmitter
E Receiver
S1 First transmitter
E1 First receiver
S2 Second transmitter
E2 Second receiver
z Axis of rotation
$\varphi 1$ Azimuthal direction
$\varphi 2$ Azimuthal direction
$\varphi 3$ Azimuthal direction
$\varphi 4$ Azimuthal direction

The invention claimed is:

1. Optical sensor according to a time-of-flight principle for detecting objects in a monitored region, the optical sensor comprising:
    a first transmitter for transmitting first light pulses into the monitored region,
    a first receiver for detecting first light pulses radiated back by a first object to be detected in the monitored region,
    a second transmitter for transmitting second light pulses into the monitored region,
    a second receiver for detecting second light pulses radiated back by the first object or a further object in the monitored region,
    at least one control and evaluation unit, which is designed:
        to control the first transmitter and to evaluate the first light pulses detected by the first receiver and
        to control the second transmitter and to evaluate the second light pulses detected by the second receiver, wherein
    a first optical reference path is formed between the first transmitter and the second receiver,
    a second optical reference path is formed between the second transmitter and the first receiver, and
    the at least one control and evaluation unit is designed:
        to trigger the first transmitter to transmit first test light pulses which reach the second receiver on the first optical reference path, and to activate the second receiver after a first time offset, the first time offset corresponding to a time of flight of the first test light pulses over the first optical reference path and/or
        to trigger the second transmitter to transmit second test light pulses which reach the first receiver on the second optical reference path, and to activate the first receiver after a second time offset, the second time offset corresponding to a time of flight of the second test light pulses over the second optical reference path, and
        to evaluate the first test light pulses detected by the second receiver and/or to evaluate the second test light pulses detected by the first receiver.

2. Optical sensor according to claim 1,
wherein
the first reference path or the second reference path is formed by a light conductor.

3. Optical sensor according to claim 2,
wherein
the light conductor is an optical fibre.

4. Optical sensor according to claim 1,
wherein
the control and evaluation unit is designed to determine the measured test light pulses over a plurality of scan periods.

5. Optical sensor according to claim 1,
wherein
the first time offset is smaller than a time of flight of light pulses from the second transmitter to an object in the monitored region and back to the second receiver or the second time offset is smaller than a time of flight of light pulses from the first transmitter to an object in the monitored region and back to the first receiver.

6. Optical sensor according to claim 1,
wherein
the control and evaluation unit is designed
to deactivate the first receiver if the first transmitter transmits test light pulses or to deactivate the second receiver if the second transmitter transmits test light pulses.

7. Optical sensor according to claim 1,
wherein
the control and evaluation unit is designed
to activate the first receiver if the first transmitter transmits light pulses or test light pulses or
to activate the second receiver if the second transmitter transmits light pulses or test light pulses.

8. Optical sensor according to claim 1, wherein
the control and evaluation unit is designed
to control the first transmitter and the second transmitter with the same frequency for transmitting test light pulses and
to control the first transmitter and the second transmitter with time offset for transmitting test light pulses.

9. Optical sensor according to claim 8,
wherein
the control and evaluation unit is designed to control the first transmitter and the second transmitter for transmitting test light pulses in respectively equal time intervals.

10. Optical sensor according to claim 1,
which is formed as a 2D scanner.

11. Optical sensor according to claim 10,
wherein
the first transmitter, the first receiver, the second transmitter and the second receiver are arranged on a rotor of the 2D scanner and
the optical axes of the first transmitter, the first receiver, the second transmitter and the second receiver are orientated transversely
relative to an axis of rotation of the rotor.

12. Optical sensor according to claim 11,
wherein
the optical axes of the first transmitter, the first receiver, the second transmitter and the second receiver are orientated perpendicularly relative to an axis of rotation of the rotor.

13. Optical sensor according to claim 10,
wherein
the optical axes of the first transmitter and the first receiver are orientated in a first azimuthal direction relative to the axis of rotation of the rotor and
the optical axes of the second transmitter and the second receiver are orientated in a second azimuthal direction relative to the axis of rotation of the rotor.

14. Optical sensor according to claim 10,
wherein
the first azimuthal direction is counter to the second azimuthal direction.

15. Optical sensor according to claim 10,
wherein
the first azimuthal direction is the same as the second azimuthal direction and
the first transmitter, the first receiver, the second transmitter and the second receiver are arranged on the rotor spaced apart from each other in a direction of the axis of rotation of the rotor.

16. Optical sensor according to claim 10,
wherein
two further pairs of a transmitter and a receiver are provided, which are also arranged on the rotor of the 2D scanner.

17. Optical sensor according to claim 1,
wherein
the optical axis of the first transmitter is tilted relative to an optical axis of the second transmitter in order to achieve an identical hit point of the transmitted light pulses on an object at a standard distance.

18. Optical sensor according to claim 1,
wherein
the first optical reference path is internally formed between the first transmitter and the second transmitter.

19. Optical sensor according to claim 1,
wherein
the second optical reference path is internally formed between the second transmitter and the first transmitter.

20. Optical sensor according to claim 1,
wherein
the control and evaluation unit is designed to average the measured test light pulses over a plurality of scan periods.

* * * * *